April 7, 1931.  W. R. POETSCH  1,799,529
MOLDING MACHINE
Filed Aug. 9, 1926  3 Sheets-Sheet 1
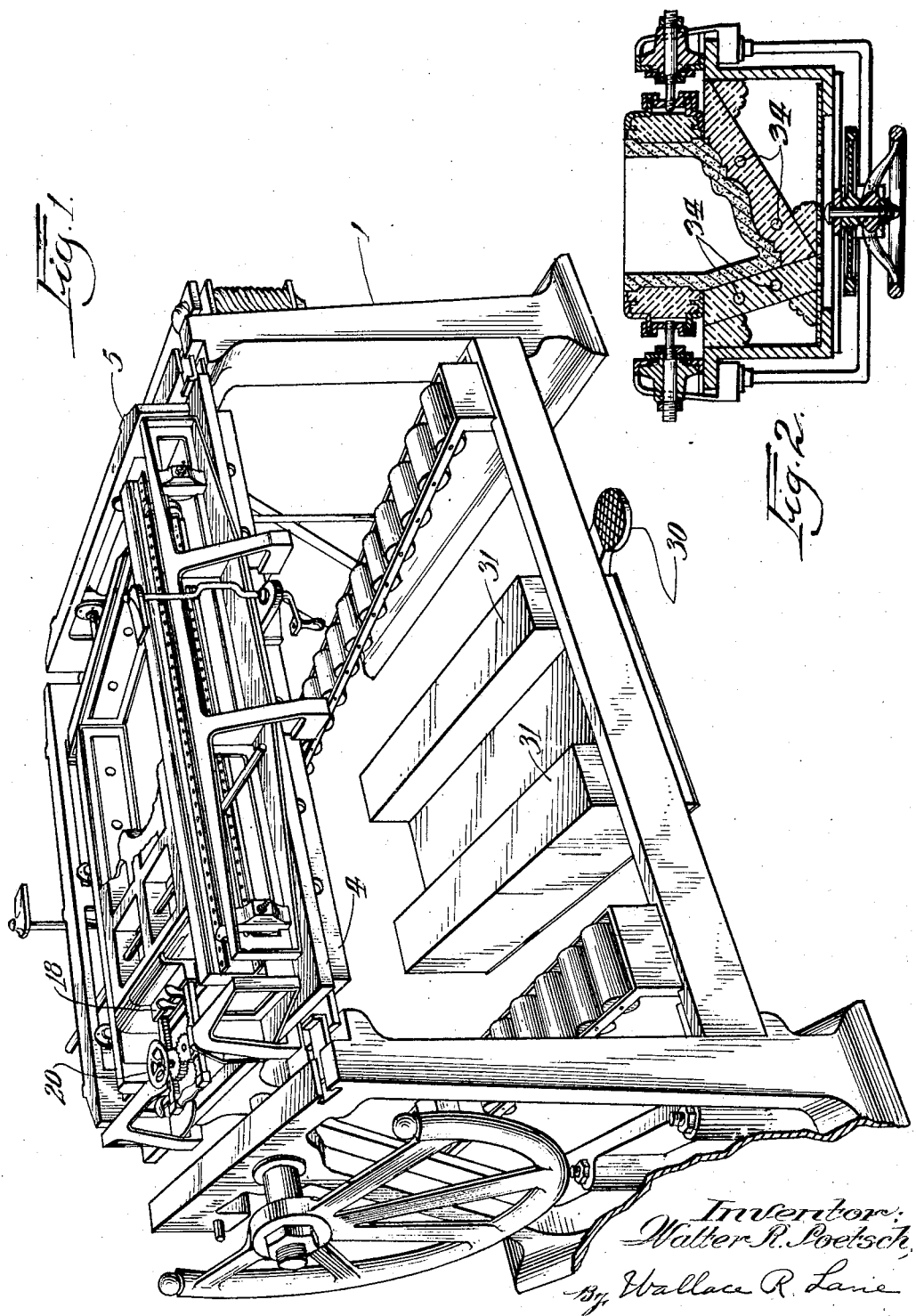

April 7, 1931. W. R. POETSCH 1,799,529
MOLDING MACHINE
Filed Aug. 9, 1926 3 Sheets-Sheet 3
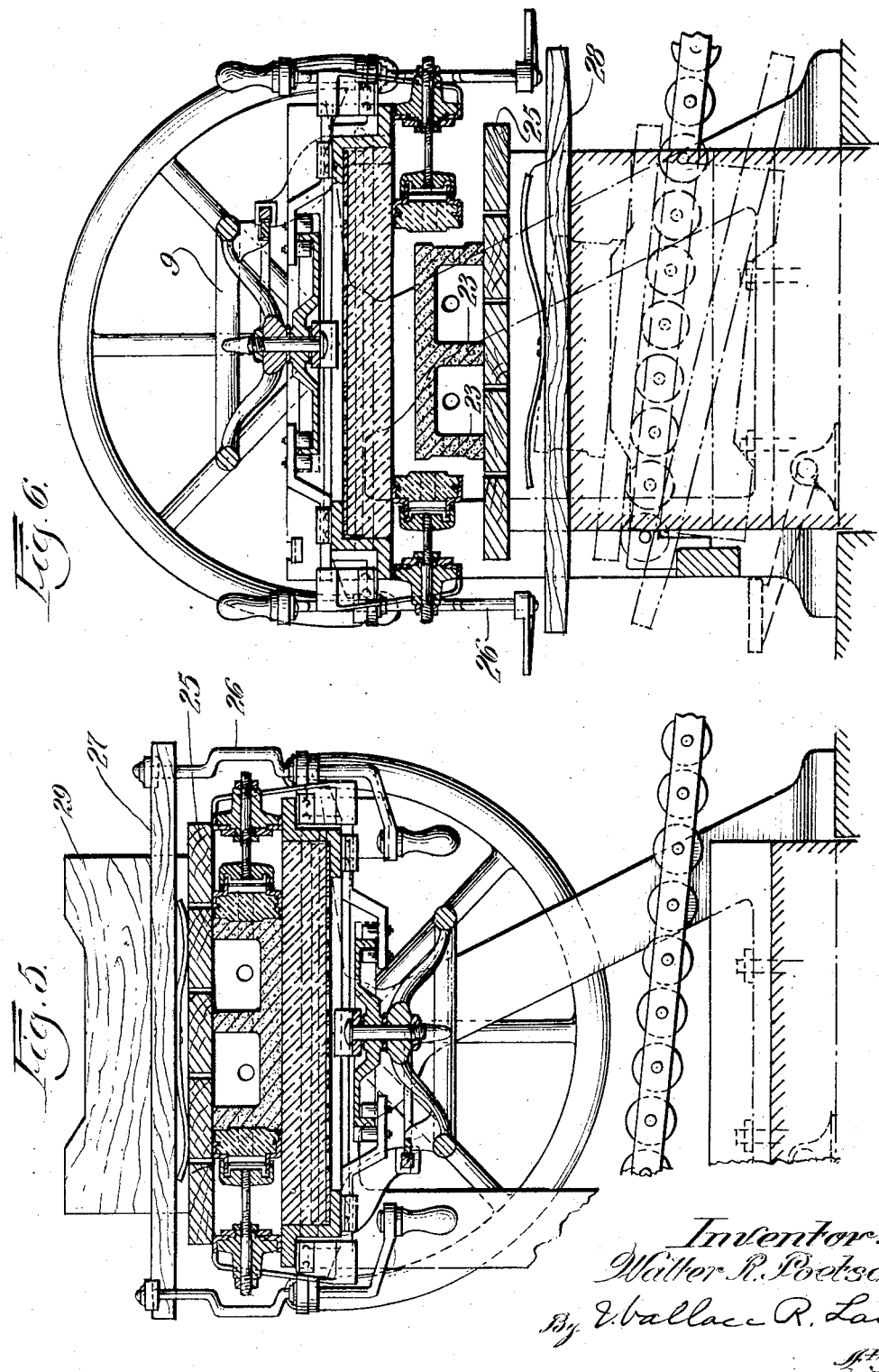
Inventor:
Walter R. Poetsch
By Wallace R. Lane
Atty Patented Apr. 7, 1931

1,799,529

UNITED STATES PATENT OFFICE

WALTER R. POETSCH, OF CHICAGO, ILLINOIS

MOLDING MACHINE

Application filed August 9, 1926. Serial No. 128,104.

This invention pertains to a molding machine having a number of surfaces which may be brought into or away from a predetermined mold forming position, in order that a mold may be formed repeatedly by these members and the molded product readily discharged therefrom.

An object of this invention is to provide a machine having such movable members and adapted to be used in forming molds of various sizes and shapes.

Another object of this invention is to provide a machine having such movable members with means for moving the members simultaneously relatively to their mold forming position.

Another object of this invention is to provide a machine having the above characteristics and which may also be inverted in order to facilitate the discharge of the molded product.

Another object of this invention is to provide a molding machine having means for inverting the machine and means for lowering the molded products out of the mold when the mold is being opened up.

Another object of this invention is to provide a machine having a plurality of members for forming the surfaces of various sized molds, which members may be adjusted into various relative positions, without cutting or altering the members, to form molds of various shapes and sizes.

Another object of this invention is to provide a machine employing movable members for forming the surfaces of a mold, the machine being so adapted as to utilize mold forming members that may be standardized and made generally applicable to a variety of products rather than specially adapted for one product only.

Further objects, advantages and capabilities will later appear and are inherently possessed by the invention.

My invention further resides in the combination, construction and arrangement of parts illustrated in the accompanying drawings, and, while I have shown therein a preferred embodiment, I wish it understood that the same is susceptible of modification and change without departing from the spirit of my invention.

Referring now to the drawings which have been selected to illustrate the invention, Fig. 1 is a perspective view of the complete machine showing a portion of a molded product lying in the mold.

Fig. 2 is a vertical sectional view of another form of a mold, but employing the same movable members, showing a specially constructed bed for forming a product of the nature illustrated.

Fig. 5 is a vertical sectional view of the machine.

Fig. 6 is a vertical sectional view of the machine in its inverted position showing a molded product being discharged from the mold.

Figure 3:
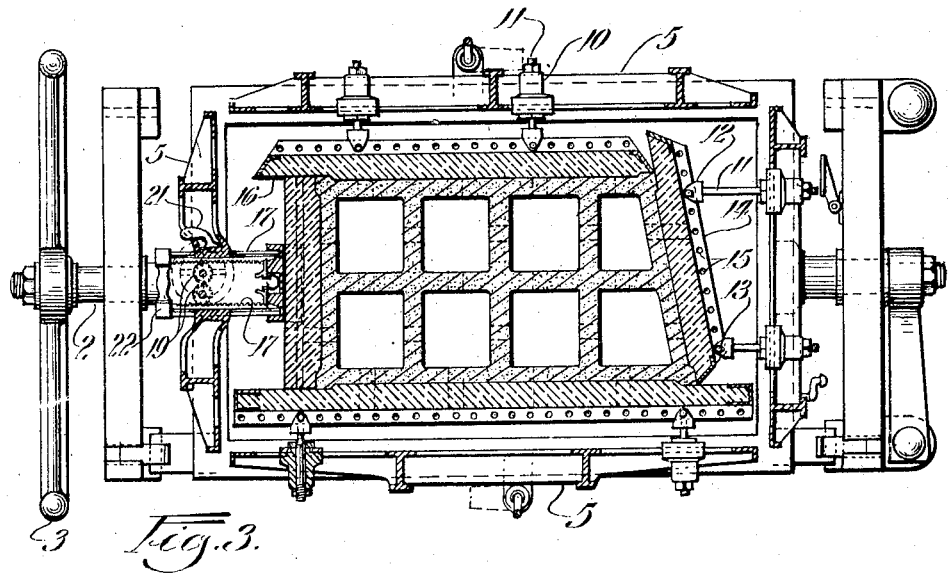
Fig. 3 is a top plan view of the molding machine showing the composition fills of the movable frames in section.

Referring now in greater detail to the drawings, the base 1 supports a horizontal shaft 2 to which is affixed a hand wheel 3. The movable mold forming members of the machine are mounted on this shaft, which is rotatable by means of the hand wheel 3 in order to invert the mold into the position shown in Fig. 6.

A frame 4 is provided to retain the bed of the mold, which bed is preferably made of a composition fill which has absorptive qualities, when the machine is used for the making of terra cotta. However, for the molding of other articles a bed of another nature may be provided.

Movable members known as the curbs 5 are arranged so as to permit them to slide horizontally across the face of the bed 4. Each of these curbs may be provided with connecting arms 6 which pass underneath the bed of the machine and which have secured to their lower inner ends a pair of cam followers 7. Each pair of cam followers embraces the two sides of a cam surface 8. It will be observed by reference to Fig. 4 that a cam surface 8 is provided for each of the pairs of cam followers and that each pair of cam followers is attached to connecting arms 6 which are in turn connected separately to the four curbs 5 which are arranged on the top of the bed. Suitably connected to the four cam surfaces is a hand wheel 9, rotatably mounted on the under side of the bed. It will be seen that the rotation of this hand wheel 9 will cause the cam and cam followers to operate to move the curbs 5 toward or away from the center of the molds. Any suitable means may be provided for guiding the motion of the curbs.

Suitably connected to each curb there is provided one or more bolt heads 10 which may be adjustably clamped in longitudinal slots in the curbs or in some other manner. Passing through each bolt head is a bolt 11, which may be affixed in an extended or retracted position as desired in the bolt head by means of threads or other suitable means. At one end of this bolt 11 there is suitably fixed a harp or bracket 12. Each harp or bracket is connected by a pin 13, or other suitable means, to a frame generally indicated as 14. Along the edge of this frame there is provided a plurality of holes 15 through which the pin 13 may be inserted. Whenever it is desired to connect the harp or bracket to some other hole 15, than the one illustrated, the bolt head 10 may be unclamped and moved along the curb and reclamped opposite the desired hole and the harp or bracket may then be properly connected to the frame at the place desired. One of the advantages gained by making it possible to move the bolt heads and harps or brackets into a number of positions is found in the effect this may have upon the location of dowels passing through the composition fill 16. The desirability and necessity of locating dowels at various points in the molded product are familiar to those who are skilled in this art and the adjustable feature above described relating to the harps or brackets and bolt heads will readily be appreciated by them. Each frame may be so shaped as to be capable of retaining a composition fill 16, which when used for making terra cotta blocks is preferably made of a composition capable of absorbing moisture.

As is clearly illustrated in Fig. 3, two of the frames 14 are arranged relatively to each other so that one end of one frame may be moved inwardly or outwardly along the surface of the adjacent frame. It can be seen by reference to Fig. 3 that the frames may be moved into various positions which will enable them to form molds of considerably different shapes and sizes. The distance between each frame and its related curb may be varied by extending or retracting the bolts 11. Furthermore, the angular relation between each frame and its related curb and consequently between adjacent frames, may be varied by extending one bolt 11 more than another bolt 11 which may be connected to another part of the frame as is illustrated at the right side of the view in Fig. 3.

It will be observed that the frame and curb provided at the left side of the machine, as illustrated in Fig. 3, differ somewhat from the frames and curbs used on the other sides of this machine. By reference to Figs. 3 and 1 it will be seen that the left hand frame is not connected to the left hand curb by means of the bolt heads and harps or brackets such as are used on the other frames. A pair of racks 17 are releasably connected by means of a releasable grip 18, which grip is affixed to the frame. A pair of spur gears 19 engage the teeth of this rack and are rotatably mounted on the curb. One of these gears is provided with a hand wheel 20. When the hand wheel 20 is rotated, the racks 17 will then be moved inwardly or outwardly and will cause the frame to approach to or recede from the curb as desired. Means for locking the spur gears and rack in a fixed relation may be provided and may consist of a suitable clamp, the handle of which indicated as 21 is shown. This left hand frame may be operatively connected with the cam and cam rollers as are the other curbs. Hence, when the rack is clamped and the cams 8 are rotated, this left hand curb will move and will cause its related frame to move in the manner as do the other curbs and frames. The frame used at this side differs from the other frames in that the support for the composition fill does not extend very far beyond the center of the frame, inasmuch as it is desirable to be able to cut the composition fill attached to this frame at both ends whenever it is desired to make a smaller mold, as will be understood by reference to Fig. 3. A hand grip 22 is provided on the rack 17 in order that this frame may be moved rapidly and relatively to its curb. The connecting means 18, whereby the racks are connected to the frame has a spring catch which enables the racks to be quickly removed in order that a new frame may be substituted readily if desired, or a pair of racks of different lengths may be attached to the same frame.

Referring to Fig. 6 showing the mold rotated by means of the hand wheel 3 into the inverted position, it will be observed that the molded product generally indicated as 23 is now resting upon the pallet board 25. Previous to the inverting of the mold, this pallet board 25 was clamped on to the top of the mold by means of hand operated clamping members 26 and members 27. A spring member 28 is provided to establish a desirable resiliency between the clamping means and the pallet board. The pallet board 25 may be provided with a bracing member 29 which will also serve as a supporting base for the pallet board after the pallet has been taken off the carrier system, with the molded product resting upon its upper surface.

A treadle 30 may be suitably connected to receiving members 31 which are adapted to be raised by means of the treadle or by other means into a position high enough for receiving the pallet board after the clamps 26 have been released, as shown in Fig. 6. By means of the treadle, or otherwise, the receiving members 31 may be moved to a position where they will properly receive the pallet board on which is resting the mold or molded product 23, as shown in Fig. 6.

Figure 4:
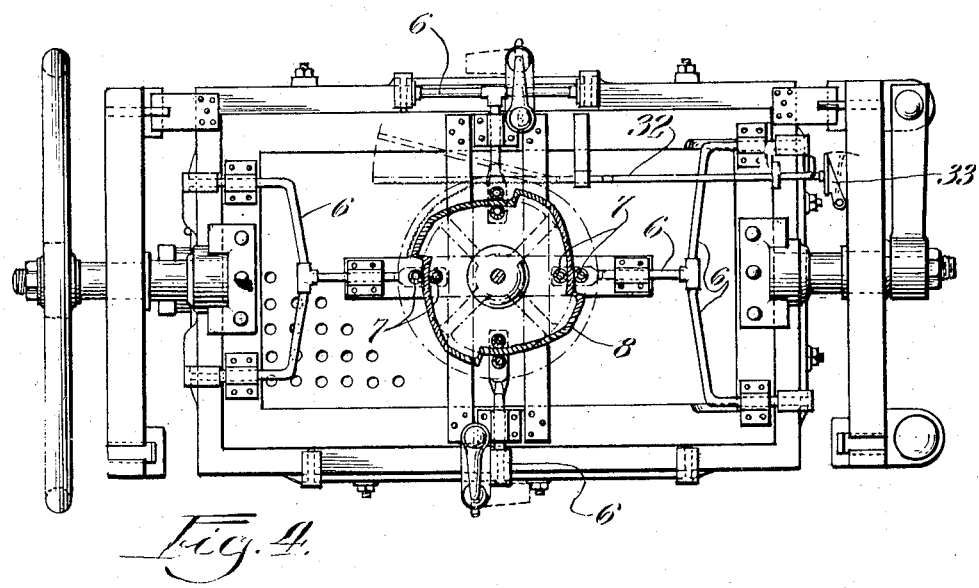
Fig. 4 is a bottom plan view of the same machine.

Referring now to Fig. 4, a rod 32 may be slidably mounted underneath the bed and may be operatively connected with the cam wheel, as by teeth on the rod and correspondingly associated teeth on the cam wheel or in other suitable manner in order that the initial movement of the cam wheel, when a mold is being opened up, will transmit a longitudinal motion to the rod 32. The other end of the rod 32 upon moving will press against a valve release member 33 which may be suitably connected with the receiving members 31 in order to cause them to move downwardly at the instant that the mold begins to open up. This valve operating mechanism has a twofold purpose. When the mold is originally rotated into the inverted position, the pallet board firmly presses against the top of the mold and holds the slidable frames 14 firmly against the surface of the bed. If this pressure were still applied as the frame members are moving away from their normal mold forming position, the frame members would be rubbing against the surface of the bed with considerable friction. Repeated action of this kind, and it is contemplated that a mold made in this manner may be used repeatedly to mold a block of the same dimension, would cause grooves to be worn in the surface of the bed. Imperfections in the molded product and the destruction of the bed would then arise by reason of the wearing of these grooves. In order, therefore, to remove the pressure of the frames against the bed at the instant the frames start to move, I have provided this valve operating rod 32 and the associated mechanism. As the pallet board begins to lower upon the operation of the cam wheel and the valve operating rod 32, the pressure is removed from the frame members and the molded product, resting on the pallet board, is readily discharged from the mold. The pallet board may then be arranged to continue in the lowering movement until it reaches a suitable carrier system, such as is diagrammatically illustrated, and which will serve to carry away the pallet board and the product.

In the operation of this device it is contemplated that the frames 14 which are used on three sides of a four-sided block, and the stop-out frame used as illustrated in the left side of the Fig. 3, may be provided with the composition fill 16 and shaped in accordance with general specifications for blocks of this character. A large number of these ordinary frames and stop-out frames may be stored convenient to the location of this machine. The composition fill which is used in connection with terra cotta blocks is generally a material having moisture absorptive qualities and is plastic in nature. The fill may be cut to provide the rebate generally employed in terra cotta blocks. It is generally understood that a single frame may be used many times in molding blocks of this nature, whether the blocks be of the same size or not, as it is an easy matter to alter the surface of the composition fill in order to make provision for the proper rebate or other contours that may be desired in the surface of the finished molded block. The composition fill mounted on the stop-out frame may be cut at either or both ends whenever it is desired to mold a block of less height than the one shown, for instance, in Fig. 3. However, it is not necessary to cut the other frames at all, it being necessary only to modify their surfaces.

The adaptability of this machine to the making of blocks of various shapes and sizes results in some great economies when the machine is used in the terra cotta manufacturing industry. It is evident that this machine may be employed for making other blocks than terra cotta blocks, but reference here will be made to its application in the making of terra cotta blocks. It has been the practice in the past to make plaster models corresponding to the dimensions and characteristics of the desired finished product. These plaster models were then used in making the molds. The sides of the mold were gradually built up by hand against the sides of the model and made in sections in order that the molds might be removed from the finished product and from the model without breaking of the mold. The model was destroyed after the mold had been made of it. The mold was then fitted with an iron band and wooden wedges driven under the band to clamp sections tight together. The mold was then filled with moist clay and turned completely over on a pallet; the face of the mold was removed and placed in original position; the wedges loosened and iron band removed after which the rest of the mold was removed from the finished product and reset piece by piece in original position. A large amount of labor has therefore been necessary to perform all the steps which preceded the forming of the mold itself. Great care had to be exercised in forming the molds and the cost of handling and storing these molds has itself been a considerable item. When my invention is employed, standard frame pieces having composition fills which are provided with surfaces which may form the standard rebates in the molded blocks are made from specifications, entirely without the use of models. Such dowel holes as are necessary are readily cut in the surfaces of these fills when and as desired. Of course, the dowel holes previously cut may be filled, in order that the frames and fills may be used repeatedly. Whenever a composition fill becomes too saturated with moisture it may be knocked out of the frame and the frame be used again. If desired, a means for drying the composition fills and particularly the fill in the bed may be utilized. This means may consist of conduits 34 passing through the composition, which conduits may carry a heated fluid or may contain a heating element, such as an electrical element. The pipes may be disposed in the bed as indicated in Fig. 2. Any number of these pipes 34 may be employed.

Referring further to Fig. 2, when desired a bed of the special shape shown therein may be provided in order to manufacture a block having the contour indicated.

Having thus shown and described my invention, I claim:

1. A molding machine comprising a plurality of members having plastic composition surfaces adapted to form the surfaces of a mold, means for moving a plurality of said members relatively to its mold forming position, the said means including a cam and a follower which are movable relative to each other and means for varying the angular relation of two said members.

2. A molding machine comprising a plurality of members having plastic composition surfaces adapted to form the surfaces of a mold, and means for moving a plurality of said members relatively to their mold forming positions, the said means including a cam and a follower which are movable relative to each other, a plurality of said members being disposed with an end of one touching a surface of another in such a relation as to permit of the expanding and contracting of the mold without altering the length of several of the members.

3. A molding machine comprising a plurality of members having surfaces adapted to form the surfaces of a mold, means for moving a plurality of said members relatively to their mold forming positions and for varying the dimensions of the product to be molded, and carrier means for carrying away from the machine the molded product, the carrier means being actuated by their initial movement of the first mentioned means.

4. A molding machine comprising a plurality of members having plastic composition surfaces adapted to form the surfaces of a mold, and means for moving a plurality of said surfaces relatively to their mold forming positions, the said means including a cam and a follower which are movable relative to each other.

5. A molding machine comprising a plurality of members having plastic composition surfaces adapted to form the surfaces of a mold, and means for moving a plurality of said members relatively to their mold forming positions, said means being connectable to one of said members at a plurality of points on said member.

6. A molding machine comprising a plurality of members having surfaces adapted to form the surfaces of a mold, and means for moving a plurality of said members relatively to their mold forming positions, one of said members having a curb connected to said means, said member being provided with a plastic composition fill which constitutes a surface of the mold and means for connecting the frame and curb at various points.

7. A molding machine comprising a plurality of members having surfaces adapted to form the surface of a mold, and means for moving a plurality of said members relatively to their mold forming positions, one of said members having a curb connected to said means, said member being provided with a plastic composition fill which constitutes a surface of the mold and means for varying the angular relation of said frame and curb.

8. A molding machine comprising a plurality of members having surfaces adapted to form the surfaces of a mold, means for moving a plurality of said members relatively to their mold forming positions and for varying the dimensions of the product to be molded, means for inverting the mold, and means for lowering the molded product simultaneously with the opening movement of the first mentioned means.

9. A molding machine comprising a plurality of curbs movable over a molding surface, members having surfaces adapted to form the surfaces of a mold secured to said curbs, means for moving said members relatively to said curbs for varying their mold forming positions, adjustable means for moving one of said members relative to the other of said members, and means releasably connecting said member to a curb whereby said member may be readily replaced.

10. A molding machine comprising a plurality of members adapted to form the surfaces of a mold, means including a curb for movably carrying said members over a molding surface, means for adjusting the angularity of certain of said members relative to one another, and means associated with a curb and one of said members for adjustably locking the same.

11. A molding machine comprising a plurality of members having surfaces adapted to form the surfaces of a mold, means for moving said members simultaneously and relatively to their mold forming positions, and means including a rack and pinion for independently moving one of said members relative to the other of said members.

12. A molding machine comprising a plurality of members having surfaces adapted to form the surfaces of a mold, means for moving said members simultaneously and relatively to their mold forming positions, means including a rack and pinion for independently moving one of said members relative to the other of said members, and means secured to said independently moved member and releasably gripping said rack whereby said member may be readily replaced.

13. A molding machine comprising a plurality of members having surfaces adapted to form the surfaces of a mold, means for moving a plurality of said members relatively to their mold forming positions, means for carrying the molded product away from said machine, and means actuated by said first mentioned means initiating movement of said carrying means.

14. A molding machine comprising a plurality of curbs movable over a molding surface, members having surfaces adapted to form the surfaces of a mold movable with said curbs, and means for connecting said members to said curbs whereby said members may be adjusted relative to said curbs for varying the product molded.

15. A molding machine comprising a plurality of curbs movable over a molding surface, members having surfaces adapted to form the surfaces of a mold movable with said curbs, means for connecting said members to said curbs whereby said members may be adjusted relative to said curbs for varying the product molded, and means for simultaneously moving said curbs and members into and out of their mold forming positions.

16. A molding machine comprising a plurality of curbs movable over a molding surface, members having surfaces adapted to form the surfaces of a mold movable with said curbs, means for connecting said members to said curbs whereby said members may be adjusted relative to said curbs for varying the product molded, means for simultaneously moving said curbs and members into and out of their mold forming positions, and means for readily and removably connecting one of said members to a curb for replacement and for varying said product.

17. A molding machine comprising a plurality of members having surfaces adapted to form the surfaces of a mold, means for varying the relative positions of said members for varying the dimensions of the molded product, means for inverting said mold, means for moving said members into and out of their mold forming positions, means adapted to be elevated for receiving the molded product, and means initiated by said means for moving said members into and out of their mold forming positions for lowering said receiving means.

In witness whereof, I hereunto subscribe my name to this specification.

WALTER R. POETSCH.